United States Patent [19]
Puglia et al.

[11] Patent Number: 4,659,582
[45] Date of Patent: Apr. 21, 1987

[54] COMPRESSIBLE SOFT CONFECTION

[75] Inventors: Wayne J. Puglia, Bayville; Andrew T. Lombardo, Bronx, both of N.Y.; Kanit J. Patanasinth, Stamford, Conn.; Walter Vink, Bloonton, N.J.

[73] Assignee: Nabisco Brands, Inc., Parsippany, N.J.

[21] Appl. No.: 785,625

[22] Filed: Oct. 8, 1985

Related U.S. Application Data

[63] Continuation-in-part of Ser. No. 553,006, Nov. 17, 1983, abandoned, which is a continuation of Ser. No. 312,608, Oct. 19, 1981, abandoned.

[51] Int. Cl.$^4$ .................. A21D 13/00; A23G 1/00; A23G 3/00
[52] U.S. Cl. .................................. 426/549; 426/285; 426/454; 426/631; 426/660
[58] Field of Search ............... 426/549, 660, 631, 285, 426/297, 305, 306, 454, 554, 613, 89, 99, 93

[56] References Cited

U.S. PATENT DOCUMENTS 3,508,926  4/1970  Werbin et al. .................. 426/285
3,639,169  2/1972  Broeg et al. .................... 426/660

Primary Examiner—George Yeung
Attorney, Agent, or Firm—Richard Kornutik

[57] ABSTRACT

A compressible soft tablet is provided which has organoleptic qualities of a baked confection, such as a cookie, cracker or wafer, and is formed of prebaked comestibles, such as graham crackers, shortbread or other types of flour-based crumbs or even unbaked raw materials, coated with chocolate or compound coatings. Upon heating or baking, the tablet provides the taste and appearance of a baked confection.

A method for preparing the soft tablet is also provided.

17 Claims, No Drawings

COMPRESSIBLE SOFT CONFECTION

CROSS REFERENCE TO RELATED PATENT APPLICATIONS

This patent application is a continuation-in-part of application Ser. No. 553,006 filed Nov. 17, 1983, now abandoned, which was a continuation of application Ser. No. 312,608 filed oct. 19, 1981, said application Ser. No. 312,608 being now abandoned.

FIELD OF THE INVENTION

The present invention relates to an improved compressible soft confection in the form of a tablet containing prebaked flour-based crumbs or unbaked flour coated with chocolate or compound coatings, and to a method for preparing such confection.

DESCRIPTION OF THE INVENTION

In accordance with the present invention, a soft, flexible, pleasant tasting tablet is provided which when chewed quickly dissolves in the mouth while providing flavor and textural qualities of a baked confection heretofore unattainable employing conventional tabletting techniques. The tablet of the invention is formed from a tabletting granulation which includes a filler material, such as prebaked comestibles or unbaked raw materials, chocolate or compound coating or other fatty materials, and other ingredients necessary for forming a tablet. Upon being heated to melt the chocolate or compound coating, the tablet of the invention takes on the appearance, taste and texture of a baked confection such as a cookie.

In addition, the present invention also provides a method for preparing the above-described tabletting granulation and tablet, which method includes the steps of mixing a filler material as described herein with chocolate, compound coating or other fatty material at a temperature of within the range of from about 95° to about 120° F., to melt the fatty material and cause the molten fatty material to coat or recrystallize around the filler material, then mixing the so-called filler material with various tabletting ingredients to form a tabletting granulation and thereafter compressing the tabletting granulation into a tablet.

In forming the tabletting granulation, the density and temperature differential of the filler material, when added to the chocolate or other fatty material, causes the fatty material to recrystallize around the filler material. Upon continued agitation and cooling, the filler material will contain in excess of 20% by weight fatty material, and preferably in excess of 30% by weight fatty material. In fact, surprisingly, although normally tabletting granulations employ excipients which are similar in physical attributes, such as particle size, it has been found that virtually any powdered material, whether water-soluble or insoluble, may be added to the molten fatty material and cause recrystallization into a powdered form.

After the tablet of the invention has been formed, for example, employing a conventional tablet press, the table may then be placed in an oven for 2 to 10 minutes or more during which time the fatty material, whether contained in chocolate or other fatty material, will melt causing the tablets to appear remarkably similar to a baked confection, such as a cookie.

Thus, it will be appreciated that the present invention provides a means for making cookies or other baked products in a simple easy manner which does not require dough handling and mixing equipment, extruders, depositing equipment and other apparatus normally employed in making conventional baked goods.

The filler material employed in the present invention may comprise a pre-baked comestible, such as flour-based crumbs, for example, graham crackers, short bread, devils food crumbs, pulverized grains, such as wheat, oats, corn, barley, or bran, dried pulverized fruits, such as apples, raisins, cherries, and the like, or pulverized nuts, such as almonds, peanuts (whole, ground or defatted), hazelnuts, walnuts and the like, and mixtures thereof. In addition, the filler material may comprise unbaked raw materials, such as flour and baking powder. Regardless of the type of filler material employed, the filler material should preferably be in powder form and have an average particle size of from about 200 microns to about 1680 microns and preferably less than about 1500 microns, and will be present in an amount within the range of from about 5 to about 40% by weight and preferably from 25 to about 35% by weight of the tabletting granulation.

The fatty material or fat-containing material employed herein will preferably be in the form of chocolate or a synthetic chocolate, such as compound coating or "Ice-Cap coating" (Nestle's synthetic chocolate formed of about 25 to about 35% by weight hydrogenated fat, emulsifier, flavor, sugar and milk solids). These fatty materials are preferred because they provide excellent flavor and sweetness with the requisite amounts of fats (in the form of hydrogenated fats), that is, fats in an amount of from about 5 to about 20%, and preferably from about 10 to about 14%, by weight of the finished tablet. Since the hydrogenated fats account for about 30 to 40% of the chocolate or synthetic chocolate, the chocolate materials may be present in an amount of from about 20 to 55%, and preferably from about 25 to about 45%, by weight of the finished compressed tablet. It has been found that where larger amounts of fats are employed, the fats must be pretreated and absorbed on a carrier, such as cornstarch, to facilitate compaction. In the present invention, no such pretreatment is required.

Other fatty materials which may be employed herein in the amounts set out above are those which may be melted, mixed with bulking agent and thereafter recrystallized and comminuted into a fine powder. These other fatty materials include fats or oils of animal, vegetable or mineral origin which are substantially water-insoluble, inert, non-toxic hydrocarbon fats and oils and derivatives thereof and may comprise any of the commonly commercially available fats or oils approved by the Food & Drug Administration and having melting points constant with desired mouth feeling factors, such as melting points ranging from 80° to 110° F., and need not be limited to melting points above body temperature. Examples of these additional fats and/or oils suitable for use herein include hydrogenated tallow, hydrogenated vegetable oil, almond oil, coconut oil, corn oil, cottonseed oil, refined linseed oil, light liquid petrolatum, heavy liquid petrolatum, olein, olive oil, palm oil, peanut oil, persic oil, sesame oil, soybean oil or safflower oil, and mixtures thereof.

The direct compaction vehicle (which must be dry blended into the granulation subsequent to recrystallizing the fatty material admixed with the filler material) may include tablet excipients resulting from pretreatment via a wet granulation technique, tabletting grade sorbitol and mannitol, mixtures thereof, dextrose monohydrate, such as Cantabe ® or Cerelose ®2001 (registered trademarks of UNIVAR and Corn Products Corp., respectively), corn syrup solids having a DE of from 38 to 45, anhydrous lactose, Encompress (blends of dicalcium phosphate dihydrate), diPac (co-crystallized sucrose with modified dextrins), sucrose, invert sugar and mixtures thereof, with tabletting sugar and dextrose monohydrate being preferred.

The direct compaction vehicle will be present in an amount of within the range of from at least about 25 to about 60%, and preferably from about 30 to about 40%, by weight of the final compressed tablet.

An emulsifier approved for use in foods by the Food & Drug Administration and having an HLB value of 8 and above, may optionally be employed in the chewable tablets of the invention in amounts ranging from about 0.05 to about 2.5% by weight, and preferably in amounts ranging from about 0.1 to about 1.0% by weight, based on the final chewable tablet formulation.

Examples of emulsifiers suitable for use herein include alkyl aryl sulfonate, or alkyl sulfates, or sulfonated amides or amines, or sulfated or sulfonated esters or ethers, or alkyl sulfonates, or dioctyl sulfosuccinate and the like, or a hydrated aluminum silicate such as micronized bentonite or kaolin, or Cab-O-Sil (which is silica pigment sold under the trademark of Cab-O-Sil by Cabot Corporation of Boston, Mass.), Quso (which is a microfine silica sold under the trademark Quso by Philadelphia Quartz Co. of Philadelphia, Pa.), and the like, triglycerol monostearate, triglycerol monoshortening, octaglyercol monooleate, octaglycerol monostearate, decaglycerol decaoleate, Span 60, and Tween 60 and 80.

Preferred are the polyoxyethylene sorbitan fatty acid esters, such as the stearates, oleates, palmitates and the like, for example Tween 60 and 80, as well as octaglycerol monooleate, triglycerol monostearate and triglycerol monoshortening.

As indicated, it is essential in forming the compressed chewable tablet of the invention that the direct compaction vehicle be added after the fatty material has recrystallized. Should the fatty material be in liquid form when the direct compaction vehicle is added, the fatty material would coat the direct compaction vehicle and render it useless as a binder and compaction vehicle.

The tablet is thus formed from dry components in the absence of water in a dry mechanical process.

The following are preferred tablet formulations in accordance with the present invention:

PREFERRED COMPRESSED TABLET CONFECTIONS

| | Parts by Weight of Finished Tablet |
|---|---|
| A. Ingredient | |
| Fatty material (chocolate or Ice-cap coating (Nestle's) | 20 to 55 |
| Filler material (flour-based crumbs) | 15 to 45 |
| Flavor (preferably chocolate) | 0.05 to 1 |
| Direct Compaction vehicle | 25 to 60 |
| B. Ingredient | |
| Fatty material (chocolate or synthetic chocolate) | 35 to 45 |
| Filler Material (raw flour and baking soda-from 15:1 to 5:1 | 25 to 35 |
| Flavor (e.g., vanilla) (weight ratio) | 0.3 to 0.8 |
| Direct compaction vehicle | 30 to 40 |

The hardness of the tablets so-produced is not directly related to compression pressure. In fact, tablets produced under medium or high pressure (for example, employing pressures of from about 4,000 to about 10,000 psi), in accordance with the method of the present invention, have excellent hardness and flexibility, and lack of brittleness, but are still easily chewed and dissolved in the mouth.

In carrying out the method of the present invention, all ingredients except the direct compaction vehicle will be mixed with the melted fatty material before it is allowed to be recrystallized. Thus, for example, in preparing a compressed confection, the fatty material, filler material and flavor will be mixed together and heated to melt the fatty material and are then mixed until all of the powdered material is absorbed by the melted fatty material. The density and temperature differential of the powdered filler material should be sufficient to cause the fatty material to recrystallize around the powdered material. As the mixture is continually agitated and allowed to cool, it transforms into a powder. Thereafter, the direct compaction vehicle is added with mixing, and the mixture is screened and is then ready for tabletting employing a conventional single punch or other conventional tablet press.

The following Examples represent preferred embodiments of the present invention.

EXAMPLE 1

A soft compressed chewable graham cracker and honey tablet having the following composition is preferred as described below.

| Graham Cracker and Honey Tablet | |
|---|---|
| Ingredient | % by Weight |
| Ice-Cap coating | 30 |
| Santone 8-1-0 | 0.75 |
| Graham cracker crumbs | 30 |
| Cantab (Dextrose monohydrate) | 36 |
| Artificial honey flavor (Warner Jenkinson 4209) | 1 |
| Vanilla 10X powder (Virginia Dare) | 0.75 |
| Graham cracker flavor F 21495 (McCormick) | 1.5 |
| | 100.00% |

The Ice-cap coating (synthetic chocolate) and emulsifier are melted in a double boiler at 120° F. The melt is transferred to a Hobart type mixer and under agitation the graham cracker crumbs and flavors are added. Mixing is continued for several minutes until all of the powdered material is absorbed by the Ice-cap coating. The density and temperature differential of the powdered material, when added to the chocolate, causes the chocolate to recrystallize around the material; under continued agitation the mixture, as it cools, transforms into a powder which contains in excess of 50% by weight chocolate. Agitation is continued for 5–10 minutes until all of the chocolate or compound coating has recrystallized. The Cantab is then added under agitation. The granulation is then processed through a single punch or other conventional tablet press with a pressure setting of up to 6000 lbs to form the chewable tablets of the invention which weight 3 gm each.

It is found that the so-formed chewable tablet confection of the invention is soft yet flexible. Upon heating in an oven for 10 minutes at 375° F. and then cooling, the tablets of the invention are found to have the appearance, taste and texture of a baked confection.

EXAMPLE 2

A soft compressed chewable shortbread tablet having the following composition is prepared as described below.

| Shortbread Tablet | |
| --- | --- |
| Ingredient | % by Weight |
| Ice-cap coating | 15 |
| Santone 8-1-0 | 0.5 |
| Salt | 0.2 |
| Shortbread flavor FD&O 178416 | 0.5 |
| Shortbread crumbs | 32.5 |
| Cantab (Dextrose monohydrate) | 43.7 |
| Vanilla 10X liquid (Virginia Dare) | 0.2 |
| Lactose USP | 7.5 |
| | 100 |

The Ice-cap coating and emulsifier are melted in a double boiler at 120° F. The melt is transferred to a Hobart-type mixer and under agitation the salt and shortbread flavor are added. Mixing is continued and then the shortbread crumbs, vanilla liquid and lactose are added. Mixing is continued an additional 5 minutes until all of the powdered material is absorbed by the Ice-cap coating. The density and temperature differential of the powdered material when added to the melted fatty material will cause the melted fatty material to recrystallize around the powdered material. As the mixture is further mixed and cools, it is transformed into a powder which contains in excess of 50% by weight chocolate (Ice cap coating). After all of the chocolate has recrystallized, the Cantab is added under agitation.

The granulation is then processed through a single punch tablet press to form the compressed soft tablets of the invention.

It is found that the so-formed chewable shortbread tablet of the invention is soft, yet flexible and upon being heated in an oven for 10 minutes at 375° F. has an excellent chocolate flavor and has the appearance, texture and taste of a baked shortbread confection.

EXAMPLE 3

The soft compressed shortbread tablet in the form of a confection having the following composition is prepared as described below.

| Ingredient | % by Weight |
| --- | --- |
| Ice-cap coating | 32.5 |
| Santone 8-1-0 | 0.75 |
| Salt | 0.2 |
| Shortbread flavor FD&O 178416 | 0.4 |
| Flour | 20 |
| Baking Powder | 3 |
| Cantab (Dextrose monohydrate) | 42.95 |
| Vanilla 10X liquid (Virginia Dare) | 0.2 |
| | 100.00 |

The Ice-cap coating (synthetic chocolate) and emulsifier are melted in a double boiler at 120° F. The melt is transferred to a Hobart type mixer and under agitation the salt and shortbread flavor are added. Mixing is continued and then the flour, baking powder and vanilla liquid are added. Mixing is continued for several minutes until all of the powdered material is absorbed by the Ice-cap coating. The density and temperature differential of the powdered material when added to the chocolate causes the chocolate to recrystallize around the material; under continued agitation the mixture, as it cools, transforms into a powder which contains in excess of 50% chocolate.

Agitation is continued for 5–10 minutes until all of the chocolate or compound coating has recrystallized. The Cantab is then added under agitation. The granulation is then processed through a single punch or other conventional tablet press with a pressure setting of up to 6000 lbs to form the tablets of the invention (3 gm each).

The tablets are wetted with a small amount of water and baked at 350° F. for 10 minutes. The product is then cooled at room temperature before packaging and is found to be remarkably similar in taste and texture to a conventional baked cookie.

EXAMPLE 4

A soft compressed brownie tablet having the following composition is prepared as described below.

| Brownie Tablet | |
| --- | --- |
| Ingredient | % by Weight |
| Sunnybrook chocolate (Wilbur) | 25 |
| Santone 8-1-0 | 0.8 |
| Salt | 0.2 |
| Flour | 20 |
| Walnut flavor F&F 13475 | 0.2 |
| Vanilla 10X liquid (Virginia Dare) | 0.2 |
| Cantab (Dextrose monohydrate) | 53.6 |
| | 100.0 |

The chocolate and emulsifier are melted in a double boiler at 100° F. The melt is transferred to a Hobart-type mixer and under agitation the salt, flour, walnut flavor and vanilla liquid are added. Mixing is continued for an additional 5 minutes until all of the powdered material is absorbed by the chocolate coating. The density and temperature differential of the powdered material when added to the melted fatty material will cause the melted fatty material to recrystallize around the powdered material. As the mixture is further mixed and cools, it is transformed into a powder which contains in excess of 50% by weight chocolate. After all of the chocolate has recrystallized, the Cantab is added under agitation.

The granulation is then processed through a single punch tablet press to form the compressed brownie tablets of the invention (each tablet weighing 3 gm).

The tablets are wetted with a small amount of water and baked at 350° F. for 10 minutes. The product is then cooled at room temperature before packaging and is found to be remarkably similar in taste and texture to conventional baked brownies.

What is claimed is:

1. An unbaked compressed soft tablet having good breakage resistance, flexibility and flavor, and, in baked form, textural qualities of a baked composition which essentially consists of, in a % by weight of said compressed soft tablet, about 5 to 40% of a filler material selected from the group consisting of graham cracker crumbs, shortbread crumbs, devils food crumbs, pulverized grains, pulverized grains, pulverized nuts, unbaked flour, baking soda and mixtures thereof, fatty material recrystallized around particles of said filler material, said fatty material being in the form of either about 5 to 20% of fat or oil or about 20 to 55% of chocolate or synthetic chocolate, about 25 to 60% of a direct compaction vehicle which binds said particles of recrystallized fatty material and filler material, under compression, into a chewable tablet, about 0.05 to 8.4% of flavoring material, and about 0 to 2.5% of an emulsifier, said tablet having been formed from said components in the absence of water in a dry mechanical process.

2. The compressed chewable tablet as defined in claim 1 wherein said fatty material is present in the form of from about 20 to about 55% of chocolate or synthetic chocolate.

3. The compressed soft tablet as defined in claim 1 wherein said filler material is present in an amount of from about 25 to about 35%.

4. The compressed soft tablet as defined in claim 1 wherein said direct compaction vehicle is present is an amount of about 30 to 40%.

5. The compressed soft tablet as defined in claim 2 wherein said fatty material is present in the form of from about 25 to about 45% of chocolate or synthetic chocolate.

6. The compressed soft tablet as defined in claim 1 wherein said fatty material is chocolate or synthetic chocolate containing from about 30 to about 40% hydrogenated fat.

7. The compressed soft tablet as defined in claim 4 wherein said fatty material is chocolate.

8. The compressed soft tablet as defined in claim 4 wherein said fatty material is a synthetic chocolate comprising from about 25 to about 35% hydrogenated fat, emulsifier, flavor, sugar and milk solids.

9. The compressed soft tablet as defined in claim 1 wherein said direct compaction vehicle is selected from the group consisting of sorbitol, mannitol, dextrose monohydrate, anhydrous lactose, dicalcium phosphate dihydrate, co-crystallized sucrose with modified dextrins, corn syrup solids having a DE of from about 38 to 45, sucrose, invert sugar, and mixtures thereof.

10. The compressed soft tablet as defined in claim 1 wherein said fatty material is chocolate or synthetic chocolate, an emulsifier is included, and said filler material is graham crackers or shortbread.

11. The compressed soft tablet as defined in claim 1 wherein said fatty material is chocolate or synthetic chocolate, an emulsifier is included, and said filler material is in the form of unbaked flour and baking soda.

12. The compressed soft tablet as defined in claim 6 wherein said fatty material contains about 35% by weight hydrogenated fat.

13. A method for forming a compressed soft tablet having good breakage resistance, flexibility, flavor and texture, in baked form, of a baked confection consisting essentially of melting a fatty material capable of recrystallization upon solidification, said fatty material being in the form of either about 5 to 20% of fat or oil or about 20 to 55% of chocolate or synthetic chocolate, adding to said melted fatty material about 5 to 40% of a filler material selected from the group consisting of graham cracker crumbs, shortbread crumbs, devils food crumbs, pulverized grains, pulverized nuts, unbaked flour, baking soda and mixtures thereof, about 0.05 to 8.4% of flavoring material, and about 0 to 2.5 of an emulsifier, allowing said melted fatty material containing said filler material to recrystallize and form particles thereof, mixing said particles with about 25 to 60% of a direct compaction vehicle in a dry blending process, and forming a compressed soft tablet from the resulting mixtures in the absence of water in a dry mechanical process, with all of said percents being percents by weight of the entire compressed tablet.

14. The method as defined in claim 13 wherein said particles of recrystallized fatty material and filler material have an average particle size of within the range of from about 200 to about 1680 microns.

15. The method as defined in claim 13 which further comprises the step of heating the finished tablet to melt the fatty material so that the tablet takes on the appearance, texture and taste of a baked confection.

16. The compressed soft tablet of claim 1 in baked form.

17. The compressed soft tablet of claim 11 in baked form.

* * * * *